(12) United States Patent
Griffith et al.

(10) Patent No.: US 9,108,602 B2
(45) Date of Patent: Aug. 18, 2015

(54) PARKING BRAKE CONTROL FOR AN AIRCRAFT HAVING AN ELECTRIC BRAKE SYSTEM

(75) Inventors: T. Todd Griffith, Seattle, WA (US); Neil T. Rapues, Lake Stevens, WA (US); Tanong Nalamliang, Stanwood, WA (US); Mark R. McConoughey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 2264 days.

(21) Appl. No.: 11/567,164

(22) Filed: Dec. 5, 2006

(65) Prior Publication Data
US 2008/0133073 A1    Jun. 5, 2008

(51) Int. Cl.
*B60T 13/02*    (2006.01)
*B60T 13/74*    (2006.01)

(52) U.S. Cl.
CPC .............. *B60T 13/02* (2013.01); *B60T 13/746* (2013.01)

(58) Field of Classification Search
USPC .............. 303/2, 3, 20, 9.63, 9.62, 122, 122.5; 701/70, 3
See application file for complete search history.

(56) References Cited

U.S. PATENT DOCUMENTS

| | | | | |
|---|---|---|---|---|
| 4,561,527 A * | 12/1985 | Nakamoto et al. | ......... | 192/219.4 |
| 4,629,043 A * | 12/1986 | Matsuo et al. | ............ | 477/184 |
| 5,417,477 A * | 5/1995 | Lasbleis | ............ | 303/3 |
| 5,957,246 A * | 9/1999 | Suzuki | ............ | 188/72.1 |
| 6,095,293 A | 8/2000 | Brundett et al. | | |
| 6,604,030 B1 | 8/2003 | Davis et al. | | |
| 6,702,405 B1 * | 3/2004 | Balz et al. | ............ | 303/192 |
| 6,732,026 B2 * | 5/2004 | Fleming et al. | ............ | 701/29 |
| 6,749,269 B1 * | 6/2004 | Niwa | ............ | 303/20 |
| 6,905,181 B2 * | 6/2005 | Iwagawa et al. | ............ | 303/155 |
| 6,997,521 B2 * | 2/2006 | Jensen et al. | ............ | 303/3 |
| 7,437,231 B2 * | 10/2008 | Kolberg | ............ | 701/70 |
| 2001/0045771 A1 * | 11/2001 | Corio et al. | ............ | 303/20 |
| 2004/0113486 A1 * | 6/2004 | Koga et al. | ............ | 303/20 |
| 2005/0109568 A1 | 5/2005 | Ether | | |
| 2007/0016353 A1 * | 1/2007 | Bredin | ............ | 701/70 |
| 2007/0029876 A1 * | 2/2007 | Makishima et al. | ......... | 303/191 |

FOREIGN PATENT DOCUMENTS

EP          1538041 A      6/2005
WO  PCT/US2007/086527    12/2008

* cited by examiner

*Primary Examiner* — Robert A Siconolfi
*Assistant Examiner* — James Hsiao
(74) *Attorney, Agent, or Firm* — Parsons Behle & Latimer

(57) ABSTRACT

A system and procedures for setting a parking brake for an aircraft having an electric brake system are disclosed. Electric activation of a parking brake as described herein mimics the sequence of events that is performed to engage the parking brake of legacy hydraulic brake systems. The electric activation process obtains brake pedal deflection data and parking brake lever status data, and determines whether to set the parking brake mechanism based upon the received data. Once the electric brake actuators are set, the electric brake system engages a friction brake to hold the brake actuators in place without having to physically lock or latch the brake pedals in a depressed position.

18 Claims, 3 Drawing Sheets

PARKING BRAKE CONTROL FOR AN AIRCRAFT HAVING AN ELECTRIC BRAKE SYSTEM

TECHNICAL FIELD

Embodiments of the present invention relate generally to aircraft braking systems. More particularly, embodiments of the present invention relate to a method and system for controlling the activation of a parking brake of an electric brake system for an aircraft.

BACKGROUND

Most older aircraft brake systems utilize direct cable or hydraulic brake actuation architectures. Such cable and hydraulic control systems may suffer from weight, performance, or reliability issues. Many of these issues have been improved upon by using electrically actuated and controlled aircraft brake systems. Electrically actuated and controlled brake systems are colloquially referred to as "brake by wire" systems. Like their hydraulic counterparts, electric brake systems for aircraft may include a parking brake feature that can be activated to prevent aircraft from rolling when parked. A parking brake mechanism in an aircraft electric brake system may be electrically controlled and commanded in a manner that is integrated with the primary command/control logic of the electric brake system. It is desirable to control the parking brake mechanism in an electric brake system in a manner that is easy for pilots to learn and is intuitive in view of the familiar protocols used in connection with traditional hydraulic brake systems.

BRIEF SUMMARY

The techniques and technologies described herein relate to the control of a parking brake mechanism in an electric brake system of an aircraft. An embodiment of an electric brake system includes a processing architecture having suitably configured processing logic that controls the activation of the parking brake mechanism in response to sensor data received from at least one brake pedal and a parking brake lever of the aircraft. The control logic for the parking brake mechanism is designed to engage the parking brake in response to physical manipulation of at least one brake pedal and the parking brake lever, where such manipulation mimics the sequence of events that is followed for setting the parking brake in legacy (hydraulic) aircraft brake systems.

The above and other aspects of embodiments of the invention may be carried out by a method of setting a parking brake of an aircraft having a brake pedal, a parking brake lever, and an electric brake system coupled to the brake pedal and to the parking brake lever. The method involves: obtaining brake pedal deflection data that indicates deflection of the brake pedal; obtaining parking brake lever status data that indicates position of the parking brake lever; and processing the brake pedal deflection data and the parking brake lever status data to set a parking brake mechanism of the electric brake system in response to manipulation of the brake pedal and the parking brake lever in a manner that mimics engagement characteristics of a legacy hydraulically actuated aircraft parking brake system.

The above and other aspects of embodiments of the invention may be carried out by a method of setting a parking brake of an aircraft having a brake pedal, a parking brake lever, and an electric brake system coupled to the brake pedal and to the parking brake lever. The method involves: obtaining brake pedal deflection data that indicates deflection of the brake pedal; obtaining parking brake lever status data that indicates position of the parking brake lever; in response to an enable condition of the brake pedal deflection data and the parking brake lever status data, electrically setting a parking brake mechanism of the electric brake system to an active state; and maintaining the active state of the parking brake mechanism without locking or latching the brake pedal.

The above and other aspects of embodiments of the invention may be carried out by a control system for a parking brake of an aircraft having a brake pedal, a parking brake lever, and an electric brake system coupled to the brake pedal and to the parking brake lever. The control system includes a processing architecture having processing logic configured to: obtain brake pedal deflection data that indicates deflection of the brake pedal; obtain parking brake lever status data that indicates position of the parking brake lever; in response to a first condition of the brake pedal deflection data and the parking brake lever status data, unlock the parking brake lever; and thereafter, in response to a second condition of the brake pedal deflection data and the parking brake lever status data, electrically set a parking brake mechanism of the electric brake system to an active state.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, digital logic architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict exemplary arrangements of elements, additional intervening elements, devices, features, or components may be present in an embodiment of the invention.

Figure 1:
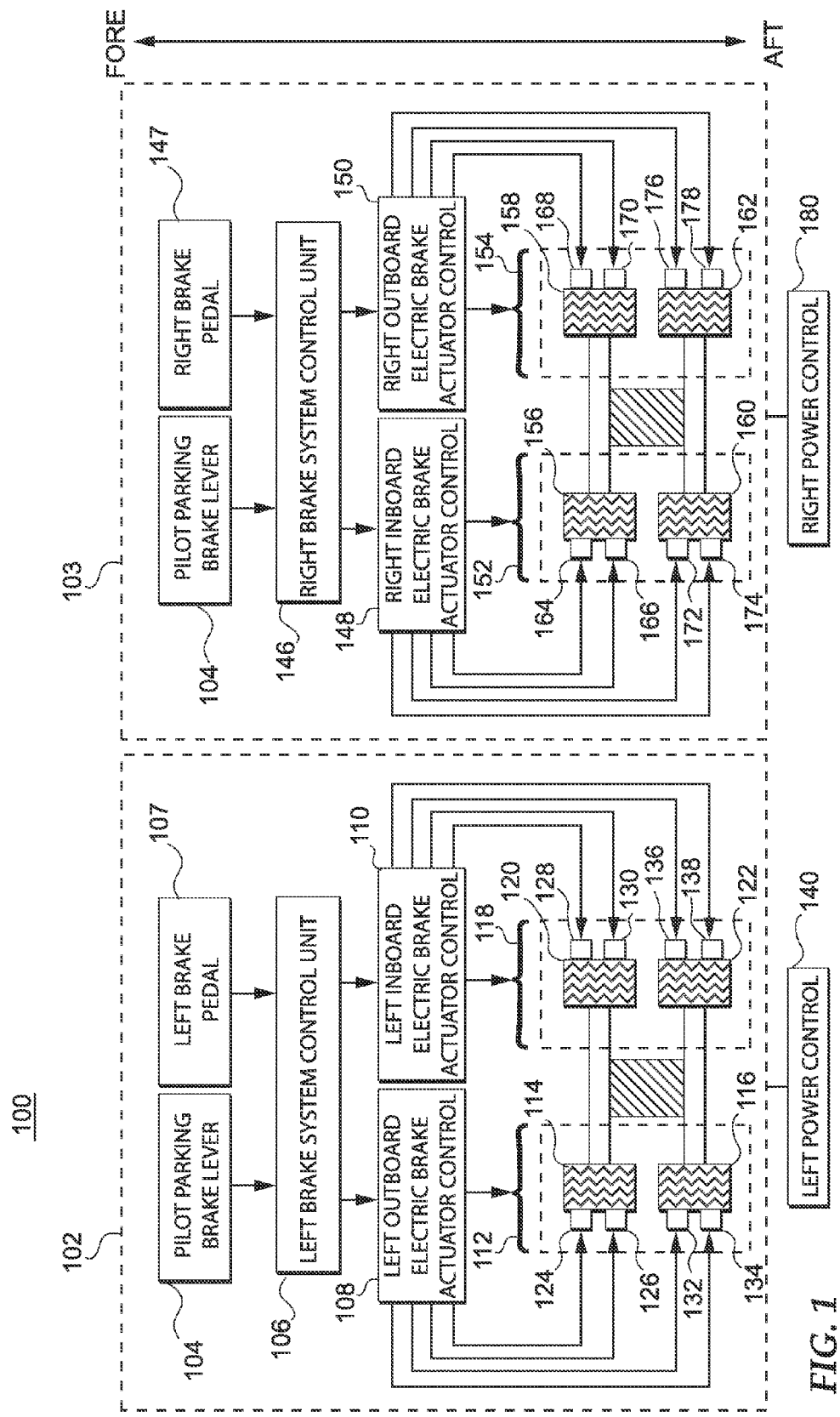
FIG. 1 is a schematic representation of an embodiment of an electric brake system for an aircraft.

FIG. 1 is a schematic representation of an example embodiment of an electric brake system 100 for an aircraft. In the example embodiment shown in FIG. 1, the aircraft employs a left side electric brake subsystem architecture 102 and a right side electric brake subsystem architecture 103, which are similarly configured. The terms "left" and "right" refer to the port and starboard of the aircraft, respectively. In practice, the two subsystem architectures 102/103 may be independently controlled in the manner described below. For simplicity, only left side electric brake subsystem architecture 102 is described in detail below. It should be appreciated that the following description also applies to right side electric brake subsystem architecture 103.

For this example deployment, left side electric brake subsystem architecture 102 generally includes: a pilot parking brake lever 104; a brake system control unit (BSCU) 106 coupled to pilot parking brake lever 104; a brake pedal 107 coupled to BSCU 106; an outboard electric brake actuator controller (EBAC) 108 coupled to BSCU 106; an inboard EBAC 110 coupled to BSCU 106; an outboard wheel group 112 that includes a fore wheel 114 and an aft wheel 116; an inboard wheel group 118 that includes a fore wheel 120 and an aft wheel 122; electric brake actuators (reference numbers 124, 128, 132, and 136) coupled to the EBACs, and friction brakes (reference numbers 126, 130, 134, and 138) coupled to the EBACs. The electric brake actuators and the friction brakes correspond to each wheel for the left side electric brake subsystem architecture 102. Although not shown in FIG. 1, an embodiment may have more than one electric brake actuator and more than one friction brake per wheel. As explained below, a friction brake is one embodiment of a parking brake mechanism suitable for use in connection with electric brake system 100.

The elements in left side electric brake subsystem architecture 102 can be coupled together using a data communication bus or any suitable interconnection arrangement or architecture that facilitates the handling of signals, data, command/control instructions, or the like. For example, a digital data communication bus or buses may be configured to communicate EBAC control signals from BSCU 106 to the EBACs, to communicate brake mechanism control signals (e.g., actuator control signals) from the EBACs to the electric brake actuators, to communicate friction brake control signals, etc. Briefly, BSCU 106 reacts to manipulation of pilot parking brake lever 104 and brake pedal 107, and, in response, generates control signals that are received by EBACs 108/110. In turn, EBACs 108/110 generate brake actuator control signals that are received by the electric brake actuators. In turn, the brake actuators engage to impede or prevent rotation of their respective wheels. These features and components are described in more detail below.

Pilot parking brake lever 104 is configured to provide pilot input to electric brake system 100. In one embodiment, the aircraft employs one pilot parking brake lever to control the application of parking brakes for all wheels on the aircraft. In other words, pilot parking brake lever 104 may be shared by both electric brake subsystem architectures on the aircraft. The pilot physically manipulates pilot parking brake lever 104 to electrically initiate engagement of the parking brake of the aircraft. The movement and/or position of pilot parking brake lever 104 may be measured by a hardware servo, switches, or an equivalent component, converted into a parking brake command control signal by a transducer or an equivalent component, and sent to BSCU 106. In the example described herein, manipulation of pilot parking brake lever 104 generates parking brake lever status data that indicates position of pilot parking brake lever 104. In turn, the parking brake lever status data influences the parking brake control logic.

Brake pedal 107 is also configured to provide pilot input to electric brake system 100. The pilot physically manipulates brake pedal 107, resulting in deflection or movement (i.e., some form of physical input) of brake pedal 107. This physical deflection is measured from its natural position by a hardware servo or an equivalent component, converted into a BSCU pilot command control signal by a transducer or an equivalent component, and sent to BSCU 106. The BSCU pilot command control signal may convey brake pedal sensor data that may include or indicate the deflection position for brake pedal 107, the deflection rate for brake pedal 107, a desired braking condition for the brake mechanisms, or the like. In the example described herein, manipulation of brake pedal 107 generates brake pedal deflection data that indicates deflection of brake pedal 107. In turn, the brake pedal deflection data influences the parking brake control logic.

BSCU 106 is an electronic control unit that has embedded and/or loadable software that digitally computes EBAC control signals that represent braking commands and parking brake commands. The electrical/software implementation allows further optimization and customization of braking performance and parking brake actuation and control as needed for the given aircraft deployment. In practice, each BSCU in electric brake system 100 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, each BSCU is implemented with a computer processor (such as a PowerPC 555) that hosts software and provides external interfaces for the software.

BSCU 106 monitors various aircraft inputs to provide control functions such as, without limitation: pedal braking; parking braking; automated braking; and gear retract braking. In addition, BSCU 106 blends antiskid commands (which could be generated internally or externally from BSCU 106) to provide enhanced control of braking. BSCU 106 obtains pilot command control signals from brake pedal 107, along with parking brake command control signals from pilot parking brake lever 104. BSCU 106 processes its input signals and generates one or more EBAC control signals that are received by EBACs 108/110. In practice, BSCU 106 transmits the EBAC control signals to EBACs 108/110 via a digital data bus. In a generalized architecture (not shown), each BSCU can generate independent output signals for use with any number of EBACs under its control.

Each EBAC in electric brake system 100 is coupled to and controlled by a BSCU. Each EBAC in electric brake system 100 may be implemented, performed, or realized in the manner described above for the BSCUs. Alternatively, the functionality of BSCU 106 and EBACs 108/110 may be combined into a single processor-based feature or component. In one embodiment, each EBAC is realized with a computer processor (such as a PowerPC 555) that hosts software, provides external interfaces for the software, and includes suitable processing logic that is configured to carry out the various EBAC operations described herein. In this embodiment, each EBAC 108/110 obtains its respective EBAC control signals from BSCU 106, processes the EBAC control signals, and generates the brake mechanism control signals for the aircraft brake assembly.

Each wheel may include an associated brake mechanism and one or more brake actuators. Consequently, braking and parking braking for each wheel may be independently and individually controlled by electric brake system 100. Each electric brake actuator is suitably configured to receive actuator control signals from an EBAC, wherein the actuator control signals influence adjustment of the electric brake actuator. In this embodiment, each electric brake actuator in electric brake system 100 is coupled to and controlled by an EBAC. In this manner, EBACs 108/110 control the brake actuators to apply, release, modulate, and otherwise control the application of the wheel brakes. In this regard, EBACs 108/110 generate the brake mechanism control signals in response to the respective EBAC control signals generated by BSCU 106. The brake mechanism control signals are suitably formatted and arranged for compatibility with the particular brake mechanism utilized by the aircraft. Those skilled in the art are familiar with aircraft brake mechanisms and the general manner in which they are controlled, and such known aspects will not be described in detail here.

The left side electric brake subsystem architecture 102 may include or cooperate with a suitably configured power control subsystem 140. Power control subsystem 140 may be coupled to EBACs 108/110 (and/or to other components of electric brake system 100), and power control subsystem 140 may be configured to apply, remove, and otherwise regulate operating power for the electric brake actuators as needed. For example, power control subsystem 140 can be enabled/disabled to provide the operating power utilized by EBACs 108/110 for purposes of activating the electric brake actuators and/or other components of left side electric brake subsystem architecture 102 after engagement of the friction brakes, which maintain the braking force needed for the parking brake feature.

The right side electric brake subsystem architecture 103 has a structure that is similar to the left side electric brake subsystem architecture 102. For this example deployment, as shown in FIG. 1, the right side electric brake subsystem architecture 103 may include, without limitation: a pilot parking brake lever 104, which may be shared with left side electric brake subsystem architecture 102; a BSCU 146; a brake pedal 147; an inboard EBAC 148; an outboard EBAC 150; an inboard wheel group 152; an outboard wheel group 154; electric brake actuators (reference numbers 164, 168, 172, and 176), and friction brakes (reference numbers 166, 170, 174, and 178) corresponding to their respective wheels (reference numbers 156, 158, 160, and 162). These components are coupled together to operate as described above for left side electric brake subsystem architecture 102, however, the right-side processing is preferably independent of the left-side processing. Also, the right side electric brake subsystem architecture 103 has a dedicated power control subsystem 180.

A parking brake control scheme and associated processing logic as described herein provides a method of electrically applying the aircraft parking brake in a manner that is similar to that found in traditional hydraulic-mechanical brake systems. In this regard, many legacy hydraulically actuated aircraft parking brake systems activate the parking brake in the following manner: first, the pilot depresses the right and left brake pedals to hydraulically actuate the wheel brakes; then, the pilot raises the parking brake lever to latch or lock the brake pedals in their depressed position to maintain the hydraulic pressure needed for wheel brake engagement. In the context of an electric brake system, hydraulic actuation and physical latching of the brake pedals is unnecessary. Accordingly, a parking brake control scheme as described herein may instead process sensor data generated by brake pedal sensors, position data generated by sensors (e.g., microswitches) at the parking brake lever, and a locking solenoid coupled to or incorporated within the parking brake lever. In the example described herein, the electric parking brake is activated in response to the electrical sensing of brake pedal deflection combined with electrical sensing of parking brake lever movement into a set position. The electric brake system can then process the brake pedal deflection data and the parking brake lever status data to set a parking brake mechanism (e.g., friction brakes) in response to manipulation of the brake pedal and the parking brake lever. The parking brake control logic is suitably configured such that the electric brake system sets the parking brake mechanism in a manner that mimics engagement characteristics of a legacy hydraulically actuated aircraft parking brake system. In other words, the same sequence of flight deck events is performed by the pilot (or other personnel) in order to electrically set the aircraft parking brake. The parking brake is electrically deactivated (released) in response to a subsequent depression of the right and left brake pedals. This action causes the parking brake lever, which may be spring loaded, to move back to its fully released position; this action also causes the friction brakes and/or the brake actuators to disengage the wheel rotors.

Referring again to FIG. 1, an embodiment of electric brake system 100 distributes wheel brake and parking brake control into four independent channels on two line replaceable units (LRUs). Each channel receives its own set of inputs (e.g., brake pedal deflection data and parking brake lever status data) and, in turn, independently commands the activation of the parking brake mechanisms for the wheels under its control. For brevity and ease of understanding, such parallel processing will not be described in detail herein.

Figure 2:
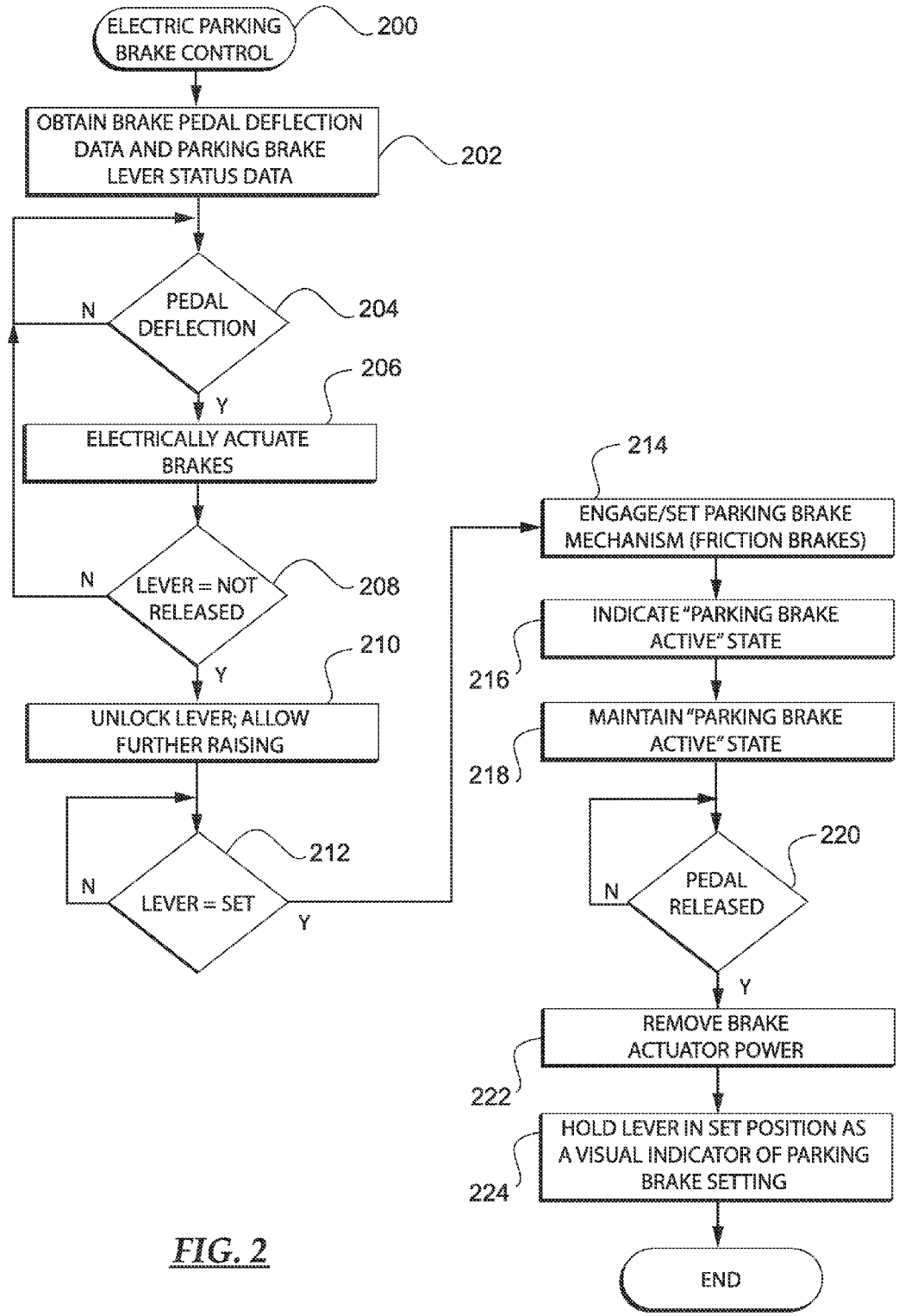
FIG. 2 is a flow chart that illustrates an electric parking brake control process, which may be performed by the electric brake system depicted in FIG. 1.

FIG. 2 is a flow chart that illustrates an electric parking brake control process 200, which may be performed by electric brake system 100. Certain tasks performed in connection with electric parking brake control process 200 may be performed by software, hardware, firmware, or any combination thereof. For illustrative purposes, the following description of process 200 may refer to elements mentioned above in connection with FIG. 1. In embodiments of the invention, portions of process 200 may be performed by different elements of the described system, e.g., a BSCU, an EBAC, or an electric brake actuator. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein.

Electric parking brake control process 200 assumes that the aircraft employs a suitably configured parking brake lever latch or lock that functions to physically hold the parking brake lever in a set (raised) position or an unset (lowered) position. The latch mechanism may also be engaged to limit the range of travel of the parking brake lever, for example, to prevent movement of the parking brake lever into its set position. This latch mechanism may be realized as an electric solenoid coupled to or integrated with the parking brake lever. Process 200 can hold the parking brake lever in the set position as a visual indication of the active state of the parking brake mechanism. Moreover, process 200 can hold the parking brake lever in the unset position as a safety measure to ensure that the parking brake mechanism is not inadvertently activated.

Process 200 may begin by obtaining brake pedal deflection data and parking brake lever status data for processing (task 202). The brake pedal deflection data indicates the amount of physical deflection of at least one brake pedal, while the parking brake lever status data indicates the physical position of the parking brake lever. Thus, this data will change in response to physical manipulation of the brake pedals and the parking brake lever.

This embodiment of electric parking brake control process 200 can be conceptually separated into two stages. The first stage corresponds to the detection of a first condition of the brake pedal deflection data and the parking brake lever status data, where detection of the first condition initiates unlocking/unlatching of the parking brake lever, which allows the parking brake lever to be moved into its set position. In this example, the first condition corresponds to a condition where (1) the brake pedal deflection data indicates a deflection value that exceeds a threshold value and (2) the parking brake lever status data indicates a NOT RELEASED status. The second stage of process 200 corresponds to the detection of a second condition of the brake pedal deflection data and the parking brake lever status data, where detection of the second condition initiates the electrical setting of the parking brake mechanism to its active state. In this example, the second condition corresponds to a condition where (1) the brake pedal deflection data still indicates a deflection value that exceeds the threshold value and (2) the parking brake lever status data indicates a SET status.

Referring again to FIG. 2, if the brake pedal deflection data indicates a deflection value that exceeds the threshold value (query task 204), then process 200 electrically actuates one or more brake actuators in the electric brake system (task 206). During task 206, the EBACs are controlled such that they generate appropriate brake actuator control signals that cause the brake actuators to engage. In the context of task 206, process 200 may enable the voltage utilized for electric brake control signals and/or enable the voltage utilized for the EBACs. As described above in the context of FIG. 1, electric brake system 100 may utilize one or more power control subsystems 140/180 to regulate these voltages. In one particular embodiment, task 206 enables a 28 VDC supply and enables a ±130 VDC supply.

In addition to query task 204, process 200 checks the status of the parking brake lever (query task 208). If the parking brake lever status data indicates the NOT RELEASED status, then electric parking brake control process 200 unlocks/unlatches the parking brake lever to allow further raising of the parking brake lever (task 210). Notably, if the criteria specified by query tasks 204 and 208 is unsatisfied, then process 200 will not initiate unlocking/unlatching of the parking brake lever, and process 200 may be re-entered at query task 204 (or, equivalently, at task 202). In one embodiment, the threshold used for query task 204 corresponds to a specified deflection angle of the brake pedal, for example, 11.5 degrees (of course, other angles may be designated to suit the needs of the particular system or aircraft). In alternate embodiments, other deflection measures (other than deflection angle) may be analyzed. In one embodiment, the threshold used for query task 208 corresponds to a particular position of the parking brake lever, which may be detected by a switch, sensor, or the like. This threshold represents a position that is partially, but not fully, raised.

Following task 210, the parking brake lever can be raised even further. A query task 212 checks whether the second condition has been reached, i.e., whether the parking brake lever status data indicates the SET status. For this example, it is assumed that the brake pedal deflection value remains above the high threshold value, i.e., the brake pedal remains depressed. Accordingly, if the brake pedal deflection data indicates a deflection value that exceeds the high threshold value (as described for query task 204) and if the parking brake lever status data indicates the SET status, then electric parking brake control process 200 can initiate the electrical activation of the parking brake mechanism. In one embodiment, the threshold used for query task 212 corresponds to another position of the parking brake lever, which may be detected by a switch, a sensor, or the like. This particular threshold represents the fully raised position of the parking brake lever.

Process 200 can then set the parking brake mechanism to its active state (task 214). In connection with task 214, process 200 may engage one or more friction brakes to maintain the brake actuators in their current positions. Once the parking brake mechanism (e.g., the friction brakes) are set, electric parking brake control process 200 may indicate a PARKING BRAKE ACTIVE state (task 216) in an appropriate manner. For example, process 200 may generate a suitable display, illuminate flight deck indicator lights, or otherwise produce a notification that informs a crew member that the parking brake is engaged. In one embodiment, process 200 can maintain the PARKING BRAKE ACTIVE state of the parking brake mechanism (task 218) without locking or latching the brake pedals. Such maintenance of the PARKING BRAKE ACTIVE state is electronically controlled and need not rely upon any further physical manipulation of the brake pedal and/or the parking brake lever.

The parking brake control logic described herein assumes that the brake pedal remains depressed while the parking brake mechanism is being electrically activated. After the parking brake mechanism is activated and the brake pedal is subsequently released (query task 220), the electric brake system can safely remove the actuation power from the brake actuators because the friction brakes are engaged (task 224). As mentioned above, removal of the EBAC operating power may be desirable to conserve the aircraft battery power. In addition, electric parking brake control process 200 can activate the parking brake lever lock/latch, which holds the parking brake lever in its set position (task 224). The locking of the parking brake lever in this position serves as a visual indication of the PARKING BRAKE ACTIVE state, which emulates legacy parking brake systems that rely upon the physical position of the parking brake lever and rely upon physical latching of the brake pedals. Notably, the holding of the parking brake lever (task 224) in this position need not actually trigger the electronic engagement of the PARKING BRAKE ACTIVE state. On the other hand, if the parking brake lever is manipulated into its released position, the friction brakes will be disengaged, resulting in the PARKING BRAKE INACTIVE state.

The parking brake mechanism can be deactivated (the friction brakes and/or the electric brake actuators are released) using any suitable triggering event. For example, deactivation may be triggered if the brake pedal or pedals are subsequently depressed beyond a threshold amount and thereafter released. In other words, deflection and release of the brake pedals causes the system to electrically change its state from the PARKING BRAKE ACTIVE state to a PARKING BRAKE INACTIVE state. In practice, this may result in the release of the friction brakes and/or the backing off of the electric brake actuators. Moreover, this will result in the physical unlocking of the parking brake lever and the return of the lever to its released position.

Figure 3:
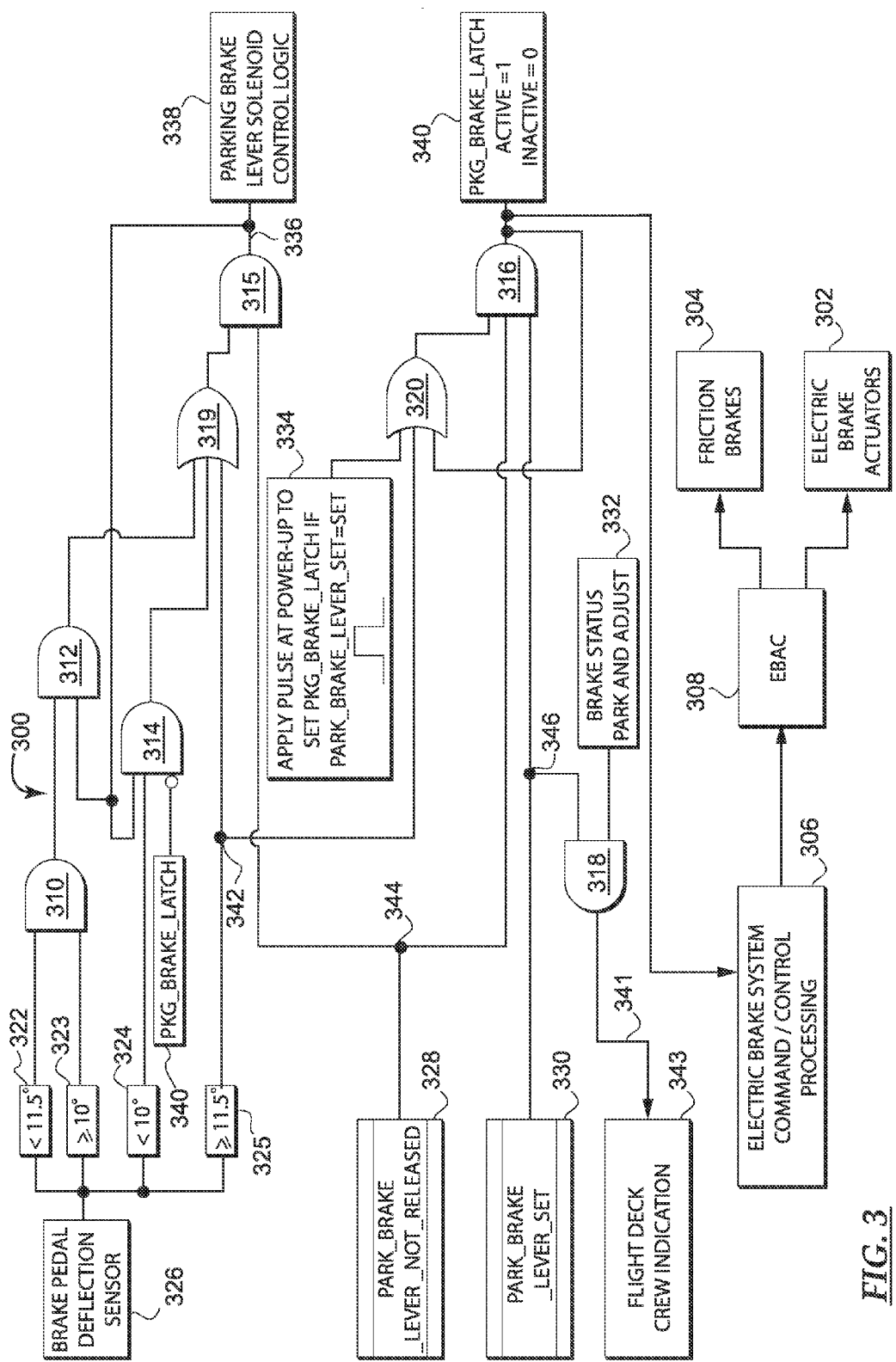
FIG. 3 is a schematic representation of control logic and electric brake system components, which may be used to carry out the electric parking brake control process depicted in FIG. 2.

FIG. 3 is a schematic representation of control logic and electric brake system components, which may be used to carry out electric parking brake control process 200. FIG. 3 depicts one embodiment of a control system 300, which may be used to carry out process 200. Control system 300 includes a processing architecture having processing logic that is suitably configured to carry out certain techniques, operations, and command/control tasks described herein. In practice, control system 300 may be realized in one or more physical components, which may be distributed throughout electric brake system 100. For example, the processing architecture of control system 300 may be implemented in a BSCU, an EBAC, a power control subsystem, the common core system (CCS) of the aircraft, or the like.

Control system 300 is suitably configured to influence the operation of electric brake actuators 302 and friction brakes 304, via a command/control processing arrangement 306 for the electric brake system and via at least one EBAC 308. Briefly, control system 300 generates one or more digital logic control signals, which serve as inputs input to command/control processing arrangement 306. In practice, processing arrangement 306 may include, without limitation: an interface from control system 300 to the CCS of the aircraft; additional processing hardware, software, firmware, or logic for other functions of the electric brake system; an interface to EBAC 308; or the like.

This embodiment of control system 300 employs digital logic and other elements coupled together as shown in FIG. 3. The logic elements include AND gates 310, 312, 314, 315, 316, and 318, and OR gates 319 and 320. Control system 300 may also include a first threshold comparator 322, a second threshold comparator 323, a third threshold comparator 324, and a fourth threshold comparator 325. For this example, control system 300 is suitably configured to receive, without limitation: brake pedal deflection data from a brake pedal deflection sensor 326 (or an equivalent component on the aircraft); parking brake lever status data from microswitches 328/330 (or equivalent components on the aircraft); a brake status park and adjust indicator 332, which may be generated by a BSCU of the electric brake system; and, under certain conditions, a power-up pulse 334. For this example, control system 300 is suitably configured to generate, without limitation: a control signal 336 for parking brake lever solenoid control logic 338; a parking brake latch signal 340 that triggers either the PARKING BRAKE ACTIVE state (with, e.g., a logic high value) or the PARKING BRAKE INACTIVE state (with, e.g., a logic low value); and a parking brake status indicator signal 341 for a flight deck crew indication system 343 that indicates whether the system is currently in the PARKING BRAKE ACTIVE state or the PARKING BRAKE INACTIVE state. These aspects of control system 300 are described in more detail below.

Brake pedal deflection sensor 326 is configured to generate brake pedal deflection data. Brake pedal deflection sensor 326 is coupled to or incorporated into the respective brake pedal. FIG. 3 depicts a simplified arrangement that only includes one brake pedal deflection sensor 326 for one brake pedal. In practice, control system 300 may utilize any number of brake pedal deflection sensors 326 to service any number of brake pedals, and the control logic depicted in FIG. 3 can be modified as needed to accommodate additional sensors. In one embodiment, control system 300 includes left and right brake pedals for the pilot, left and right brake pedals for the first officer, and four respective brake pedal deflection sensors 326 (or four respective groups of brake pedal deflection sensors).

Control system 300 may also employ a suitable sensor or detector architecture that generates the parking brake lever status data. For the illustrated embodiment, control system 300 employs a microswitch 328 that switches between a RELEASED status and a NOT RELEASED status for the parking brake lever (depending upon the physical position of the parking brake lever). Microswitch 328 is coupled to or incorporated into the parking brake lever. For this example, microswitch 328 generates a logic high value as an output when the parking brake lever is at least partially raised (corresponding to the NOT RELEASED status), and generates a logic low value when the parking brake lever has not been raised (corresponding to the RELEASED status). Similarly, control system 300 may include another microswitch 330 that switches between a NOT SET status and a SET status for the parking brake lever, where the SET status represents the fully raised or engaged position of the parking brake lever. Microswitch 330 may be coupled to or incorporated into the parking brake lever. For this example, microswitch 330 generates a logic high value as an output when the parking brake lever is fully raised (corresponding to the SET status), and generates a logic low value when the parking brake lever is not fully raised (corresponding to the NOT SET status).

Comparator 322 functions to compare the brake pedal deflection value to a relatively high threshold value. In one embodiment, this threshold value corresponds to a specified deflection angle of the brake pedal, for example, 11.5 degrees (of course, other angles may be designated to suit the needs of the particular system or aircraft). In alternate embodiments, other deflection measures (other than deflection angle) may be analyzed. The output of comparator 322 will be a logic high value if the brake pedal deflection value is less than the high threshold value; otherwise, the output of comparator 322 will be a logic low value. Control system 300 may include another comparator 323 that is configured to compare the brake pedal deflection value to a relatively low threshold value that is less than the high threshold value. In this example, the low threshold value corresponds to a deflection angle of about 10.0 degrees (of course, other angles may be designated to suit the needs of the particular system or aircraft). The output of comparator 323 will be a logic high value if the brake pedal deflection value is greater than or equal to the low threshold value; otherwise, the output of comparator 323 will be a logic low value. Consequently, the output of AND gate 310 will be a logic high value only if the brake pedal deflection value is at least 10.0 degrees and less than 11.5 degrees.

In this embodiment, comparator 324 is also configured to compare the brake pedal deflection value to the low threshold value (10.0 degrees). The output of comparator 324 will be a logic high value if the brake pedal deflection value is less than the low threshold value; otherwise, the output of comparator 324 will be a logic low value. The output of comparator 324 serves as one input to AND gate 314.

Control system 300 may also include comparator 325, which is configured to compare the brake pedal deflection value to the high threshold value (11.5 degrees). The output of comparator 325 (which is present at a node 342) will be a logic high value if the brake pedal deflection value is greater than or equal to the high threshold value; otherwise, the output of comparator 325 will be a logic low value.

Microswitch 328 changes from its RELEASED state to its NOT RELEASED state when the parking brake lever is at least partially raised. As mentioned above, the output of microswitch 328 (which is present at a node 344) will be a logic high value when the parking brake lever is in the NOT RELEASED state, and will be a logic low value when the parking brake lever is in the RELEASED state.

Microswitch 330 changes from its NOT SET state to its SET state when the parking brake lever is fully raised. As described above, the output of microswitch 330 (which appears at a node 346) will be a logic high value when the parking brake lever is in the SET state, and will be a logic low value when the parking brake lever is in the NOT SET state.

The output of AND gate 314 will be a logic high value only if: (1) the brake pedal deflection value is less than the low threshold; (2) parking brake latch signal 340 is a logic low value, i.e., the system is in the PARKING BRAKE INACTIVE state; and (3) control signal 336, which influences the operation of parking brake lever solenoid control logic 338, is a logic high value. Otherwise, the output of AND gate 314 will be a logic low value. The output of AND gate 312 will be a logic high value only if: (1) the brake pedal deflection value is less than the high threshold; (2) the brake pedal deflection value is greater than or equal to the low threshold; and (3) the control signal 336 is a logic high value.

As mentioned above, the aircraft may employ an electrically activated parking brake lever locking mechanism. This parking brake lever lock can be realized with, for example, an electric solenoid coupled to or incorporated within the parking brake lever. The output of AND gate 315, which represents control signal 336 for parking brake lever solenoid control logic 338, depends on the output of OR gate 319 and the state of microswitch 328.

Control signal 336 will power or unpower the parking brake lever solenoid as needed. For example, control signal 336 may serve as a trigger signal for the electric solenoid such that a logic high value for control signal 336 unlocks the parking brake lever. In this embodiment, the parking brake lever solenoid control logic 338 prevents the parking brake lever from being fully raised unless: (1) the output of OR gate 319 is a logic high value; and (2) the parking brake lever is in the NOT RELEASED state. Moreover, the parking brake lever solenoid control logic 338 is suitably configured to handle the condition where the brake pedal deflection value falls below the high threshold value while the parking brake lever is in its NOT RELEASED state. In particular, the system keeps the solenoid powered such that the parking brake lever is not locked or jammed in an intermediate state.

In this embodiment, a logic high value of parking brake latch signal 340 triggers activation of the parking brake mechanism, and a logic low value of parking brake latch signal 340 triggers deactivation of the parking brake mechanism. In FIG. 3, parking brake latch signal 340 is generated by AND gate 316, and parking brake latch signal 340 also serves as an input to AND gate 314 and to OR gate 320. Notably, the output of AND gate 316 will be a logic high value only if: (1) the output of OR gate 320 is high; and (2) the parking brake lever is in the SET state (i.e., the output of microswitch 328 is a logic high value indicating that the parking brake lever is NOT RELEASED, and the output of microswitch 330 is a logic high value indicating that the parking brake lever is SET).

OR gate 320 functions to regulate the output of AND gate 316 and, therefore, to regulate whether to activate or deactivate the parking brake mechanism. For this example, OR gate 320 receives power-up pulse 334 as one input signal. Power-up pulse 334 is a pulsed logic high value that is generated at power-up of a system component (such as the respective BSCU), but only if the parking brake lever is in the SET state. This enables control system 300 to set parking brake latch signal 340 to a logic high value (thus activating the parking brake) if the parking brake lever is in the SET position before the system is initialized. This contemplates the usual scenario where the aircraft is powered down while it is parked and subsequently powered up for operation.

OR gate 320 receives the output of high threshold comparator 325 as a second input, and the output of AND gate 316 as a third input. Accordingly, for the illustrated embodiment, the output of OR gate 320 is a logic high value if: (1) power-up pulse 334 is high; (2) the brake pedal deflection value is greater than or equal to the high threshold; or (3) the output of AND gate 316 indicates the PARKING BRAKE ACTIVE state. This feedback loop from AND gate 316 mimics the operation of legacy brake systems, where the brake pedals are locked after the parking brake lever is set (which maintains the parking brake in an active state). In this embodiment of the electric brake system, the brake pedals are not locked down in response to setting of the parking brake lever. Instead, the feedback loop functions to maintain the PARKING BRAKE ACTIVE state under such conditions.

The output of AND gate 318, which represents parking brake status indicator signal 341, will be a logic high value only if (1) the parking brake lever is in the SET state and (2) brake status park and adjust indicator 332 is a logic high value. Brake status park and adjust indicator 332 may be generated by the BSCU as an indication that the aircraft is parked. For this example, brake status park and adjust indicator 332 is a status signal generated by the BSCU after it receives feedback/confirmation from the EBACs that the friction brakes are set or not set. Thus, AND gate 318 represents the logic used to relay to the crew that the parking brakes are set. For this embodiment, the output of AND gate 318 will be driven to a logic high value in response to microswitch 330 being in the SET state and brake status park and adjust indicator 332 being a logic high value. Parking brake status indicator signal 341 controls the operation of flight deck crew indication system 343, which may provide a visual and/or audio notification of parking brake activation.

For this embodiment, the output of AND gate 316, namely, parking brake latch signal 340, is received by command/ control processing arrangement 306. In practice, parking brake latch signal 340 serves as a primary "on/off" signal for the parking brake feature—the parking brakes will not be activated unless parking brake latch signal 340 is a logic high value. Moreover, command/control processing arrangement 306 may be suitably configured to control electric brake actuators 302 and/or friction brakes 304 in any desired manner to support different parking brake techniques. For example, command/control processing arrangement 306 may be configured with processing logic that adjusts the amount of force imparted by electric brake actuators 302 in response to the system and/or operational conditions. In this regard, electric brake actuators 302 may impart relatively low force when the aircraft engines are idling, and impart relatively high force when the aircraft engines are above idling (which may occur at certain times even when the aircraft is parked).

As described above in the context of electric brake system 100, command/control processing arrangement 306 may cooperate with at least one EBAC 308, friction brakes 304 (which are coupled to and controlled by EBAC 308), and electric brake actuators 302 (which are coupled to and controlled by EBAC 308). FIG. 3 depicts a simplified electric brake system; in practice, an embodiment may include more than one EBAC, any number of friction brakes, and any number of electric brake actuators for each brake rotor. Friction brakes 304 are suitably configured to maintain brake actuators 302 in a deployed condition. Thus, friction brakes 304 cooperate with, and may be coupled to, brake actuators 302. Friction brakes 304 represent mechanical means for engaging brake actuators 302. In other words, friction brakes 304 are configured to hold brake actuators 302 in place even though operating power is removed from EBAC 308 and/or brake actuators 302. Friction brakes 304 allow brake actuators 302 to remain engaged without drawing an excessive amount of power from the aircraft battery. In this example, EBAC 308 controls the application of friction brakes 304 using suitably formatted control signals.

If the parking brake lever is released such that it no longer remains in its SET position, then parking brake status indicator signal 341 will be driven to a logic low value, parking brake latch signal 340 will be driven to a logic low value and, in turn, EBAC 308 will disengage friction brakes 304, thus deactivating the parking brake mechanism. Likewise, parking brake status indicator signal 341 will be driven low to deactivate the parking brake set indication to the crew if brake status park and adjust indicator 332 changes to a logic low value.

While at least one example embodiment has been presented in the foregoing detailed description, it should be appreciated that a vast number of variations exist. It should also be appreciated that the description herein is not intended to limit the scope, applicability, or configuration of the embodiments of the invention in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of setting a parking brake of an aircraft having a brake pedal, a parking brake lever, and an electric brake system coupled to the brake pedal and to the parking brake lever, the method comprising:
    obtaining brake pedal deflection data that indicates deflection of the brake pedal to a brake application condition;
    obtaining parking brake lever status data that indicates position of the parking brake lever; and
    processing the brake pedal deflection data and the parking brake lever status data to set a parking brake mechanism of the electric brake system only on condition of simultaneous deflection of the brake pedal beyond a threshold in the brake application condition and manipulation of the parking brake lever, said electric brake system comprising a combined pedal and parking brake system of electrically actuated brakes and not comprising hydraulically actuated brakes.

2. A method according to claim 1 wherein processing the brake pedal deflection data and the parking brake lever status data comprises unlocking the parking brake lever if:
    the brake pedal deflection data indicates a deflection value that exceeds the threshold value; and
    the parking brake lever status data indicates a "not released" status.

3. A method according to claim 2, wherein unlocking the parking brake lever allows the parking brake lever to be moved into a set position.

4. A method according to claim 3, wherein processing the brake pedal deflection data and the parking brake lever status data comprises electrically actuating a brake actuator in the electric brake system if:
    the brake pedal deflection data indicates a deflection value that exceeds the threshold value; and
    the parking brake lever status data indicates a "set" status.

5. A method according to claim 4, wherein processing the brake pedal deflection data and the parking brake lever status data comprises:
    electrically setting the parking brake mechanism to an active state; and
    removing actuation power from the brake actuator.

6. A method according to claim 1, wherein processing the brake pedal deflection data and the parking brake lever status data comprises electrically setting the parking brake mechanism to an active state.

7. A method according to claim 6, wherein processing the brake pedal deflection data and the parking brake lever status data comprises maintaining the active state of the parking brake mechanism without locking or latching the brake pedal.

8. A method according to claim 6, wherein processing the brake pedal deflection data and the parking brake lever status data comprises holding the parking brake lever in a set position as a visual indication of the active state.

9. A method of setting a parking brake of an aircraft having a brake pedal, a parking brake lever, and an electric brake system coupled to the brake pedal and to the parking brake lever, the method comprising:
    obtaining brake pedal deflection data that indicates an enable condition indicating deflection of the brake pedal beyond a threshold in a brake application condition;
    obtaining parking brake lever status data that indicates a raised position of the parking brake lever;
    only on condition of simultaneous detection of both the enable condition of the brake pedal deflection data and the parking brake lever status data, electrically setting a parking brake mechanism of the electric brake system to an active state, said electric brake system comprising a combined pedal and parking brake system of electrically actuated brakes and not comprising hydraulically actuated brakes; and
    maintaining the active state of the parking brake mechanism without locking or latching the brake pedal.

10. A method according to claim 9, further comprising unlocking the parking brake lever if the brake pedal deflection data indicates a deflection value that exceeds the threshold value, and if the parking brake lever status data indicates a "not released" status, wherein unlocking the parking brake lever allows the parking brake lever to be moved into a set position.

11. A method according to claim 10, wherein electrically setting the parking brake mechanism comprises electrically actuating a brake actuator in the electric brake system if:

the brake pedal deflection data indicates a deflection value that exceeds the threshold value; and the parking brake lever status data indicates a "set" status.

12. A method according to claim 9, further comprising holding the parking brake lever in a set position as a visual indication of the active state.

13. A control system for a parking brake of an aircraft having a brake pedal, a parking brake lever, and an electric brake system coupled to the brake pedal and to the parking brake lever, the control system comprising a processing architecture having processing logic configured to:

obtain brake pedal deflection data that indicates deflection of the brake pedal relative to a threshold in a brake application condition;

obtain parking brake lever status data that indicates position of the parking brake lever;

only on condition of simultaneous detection of both a first condition of the brake pedal deflection data and the parking brake lever status data, unlock the parking brake lever; and thereafter, only on condition of simultaneous detection of both a second condition of the brake pedal deflection data and the parking brake lever status data, electrically set a parking brake mechanism of the electric brake system to an active state, said electric brake system comprising a combined pedal and parking brake system of electrically actuated brakes and not comprising hydraulically actuated brakes.

14. A control system according to claim 13, wherein the processing logic is configured to process the brake pedal deflection data and the parking brake lever status data in response to deflection of the brake pedal beyond the threshold and manipulation of the parking brake lever.

15. A control system according to claim 13, wherein the first condition corresponds to a condition where:

the brake pedal deflection data indicates a deflection value that exceeds the threshold value; and the parking brake lever status data indicates a "not released" status.

16. A control system according to claim 15, wherein the second condition corresponds to a condition where:

the brake pedal deflection data indicates a deflection value that exceeds the threshold value; and the parking brake lever status data indicates a "set" status.

17. A control system according to claim 15, wherein the processing logic is configured to process the brake pedal deflection data and the parking brake lever status data to maintain the active state of the parking brake mechanism without locking or latching the brake pedal.

18. A control system according to claim 15, wherein the processing logic is configured to process the brake pedal deflection data and the parking brake lever status data to hold the parking brake lever in a set position as a visual indication of the active state.

* * * * *